May 11, 1965 B. E. PALMER 3,182,797

MEMORY SYSTEM

Filed Nov. 13, 1962 3 Sheets-Sheet 1

INVENTOR
B. E. PALMER
By J. J. Lipari
ATTORNEY

May 11, 1965 B. E. PALMER 3,182,797

MEMORY SYSTEM

Filed Nov. 13, 1962 3 Sheets-Sheet 2

INVENTOR
B. E. PALMER
BY J. J. Lipari
ATTORNEY

May 11, 1965 B. E. PALMER 3,182,797

MEMORY SYSTEM

Filed Nov. 13, 1962 3 Sheets-Sheet 3

INVENTOR
B. E. PALMER
By [signature]
ATTORNEY

United States Patent Office 3,182,797

Patented May 11, 1965

3,182,797
MEMORY SYSTEM

Burtis E. Palmer, Allentown, Pa., assignor to Western Electric Company, Incorporated, New York, N.Y., a corporation of New York Filed Nov. 13, 1962, Ser. No. 237,071
3 Claims. (Cl. 209—74)

This invention relates to memory systems and particularly to a memory system utilized for testing articles.

In the manufacture of certain articles, such as semiconductor devices, which have variations in characteristics, it is necessary to test these articles and to classify or sort them into various groups or codes according to the results of the tests, all articles within a particular group having like characteristics. Further, where large quantities of articles are involved, it is necessary that the testing and sorting be performed with a minimum expenditure of time and labor. This can be best achieved by providing an apparatus, such as that disclosed in the pending patent application of J. W. McGrath, Serial Number 97,509, filed March 22, 1961, now Patent 3,106,290 and assigned to the assignee of the present application, which apparatus is capable of performing various and numerous tests on the articles and then sorting them according to the results of the tests, both operations being performed automatically.

Briefly, the apparatus disclosed therein includes a series of supports movable in a given path to carry the articles into successive test stations where test units are mounted and adapted for inclusion of the articles into test circuits. Each support has a memory unit associated therewith which includes a series of indicating elements movable between accept and reject positions, each element being responsive to actuators rendered effective at the various stations upon conclusion of their respective tests. In another area, the memory, that is, the indicating elements, is "read out" and the articles sorted into their respective groups or codes.

It is an object of this invention to provide a novel memory system for use in such test apparatus.

With this and other objects in mind, the present invention contemplates a memory system for use in test apparatus of the type described hereinabove whereby information in optical form regarding the characteristics of an article, as determined by the testing thereof, is stored in a plurality of "On-Off" photoelectric memory devices in one area of the apparatus and is "read out" in another area thereof for purposes of sorting the articles into groups or codes.

The invention will be more readily understood from the detailed description which follows when read in conjunction with the drawings, wherein.

Figure 1:
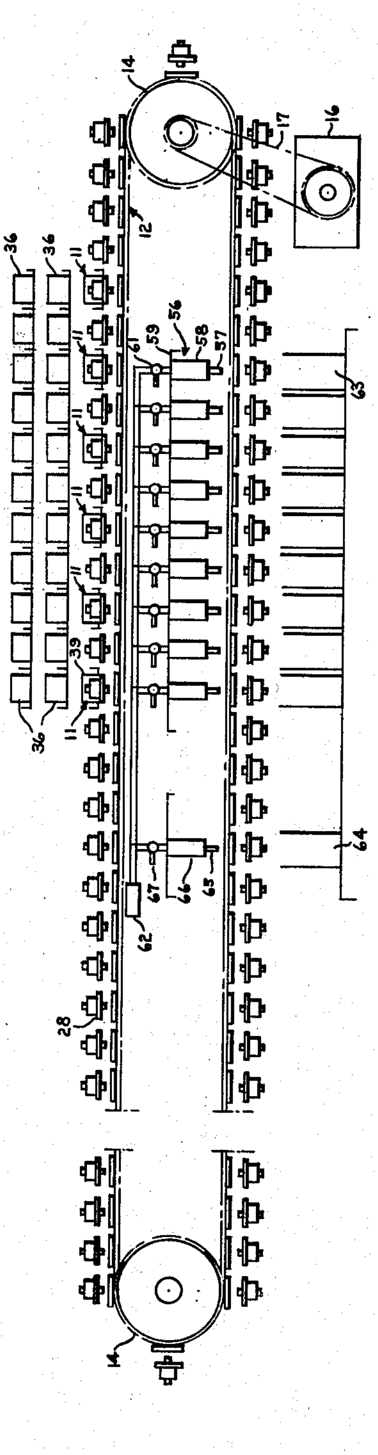
FIG. 1 is a schematic illustration of the test apparatus within which the invention is preferably incorporated.

Referring now to the drawings, the invention will be described as preferably being used in the test apparatus illustrated schematically in FIG. 1. The apparatus illustrated therein includes a plurality of test stations, generally designated by the numeral 11, mounted alongside an endless conveyor, generally designated by the reference numeral 12. The conveyor 12 includes a pair of spaced endless chains 13—13 (FIG. 3) extending around a pair of sprockets 14—14, the sprockets being driven intermittently by a power means 16 through a suitable connection, such as the endless belt 17. The power means 16 may be any suitable drive including, for example, an electric motor driving a suitable escapement mechanism such as a cam or a Geneva unit to advance the conveyor a given distance between each interval of rest.

Figure 2:
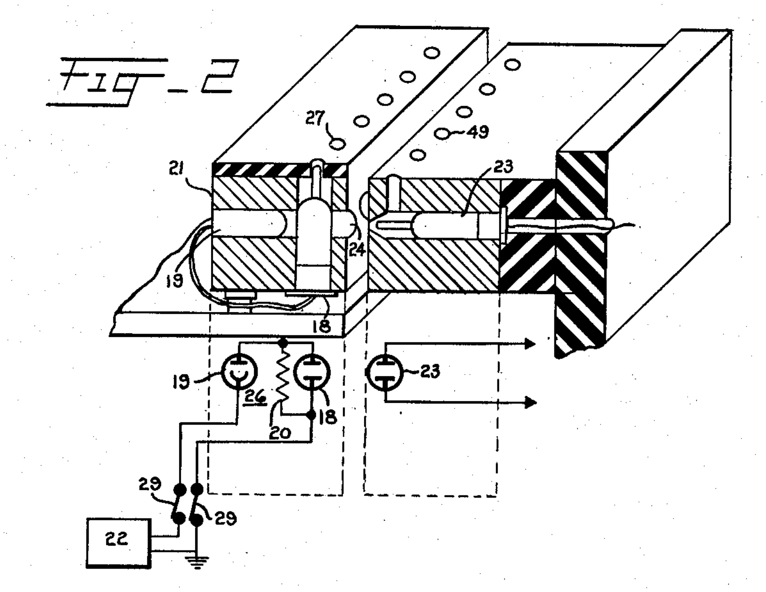
FIG. 2 illustrates a photoelectric memory block having a plurality of "On-Off" photoelectric memory devices therein and a "read in" block having a plurality of light sources therein.

FIG. 2 illustrates an "On-Off" photoelectric memory device generally designated by the numeral 26 which includes a neon lamp 18 and a photoelectric cell 19 disposed with respect to each other such that light radiated by the lamp 18 will impinge on the photo cell 19. Circuitwise, the lamp 18 and cell 19 are connected a series with a source of D.C. voltage 22, a resistor 20 being connected across the lamp. In operation, the voltage across the lamp 18 with the photo cell 19 in its de-energized state is insufficient to turn the lamp on. However, if light from a suitable source, such as a lamp 23, impinges on the photo cell 19, its resistance will decrease. Accordingly, the voltage across the lamp 18 will increase to a magnitude sufficient to turn it on. In turn, the light energy radiated by the lamp 18 impinges on photo cell 19 thereby keeping its resistance at a low value and maintaining energization of the lamp 18. The condition of the memory device 26 when the lamp 18 is energized will be hereinafter referred to as the "On" state of the device. Conversely, the condition of the device 26 when the lamp 18 is de-energized will be hereinafter referred to as the "Off" state of the device.

In the preferred embodiment used to illustrate the invention, a plurality of memory devices 26, each representing a particular group or code are employed. The devices 26—26 are encased in a block 21 having a plurality of apertures 24—24, one for each device, to permit light to be radiated into and out of the devices. Additionally, a plurality of apertures 27—27, one for each device 26, is provided to enable an operator to monitor a testing operation.

Figures 3, 4:
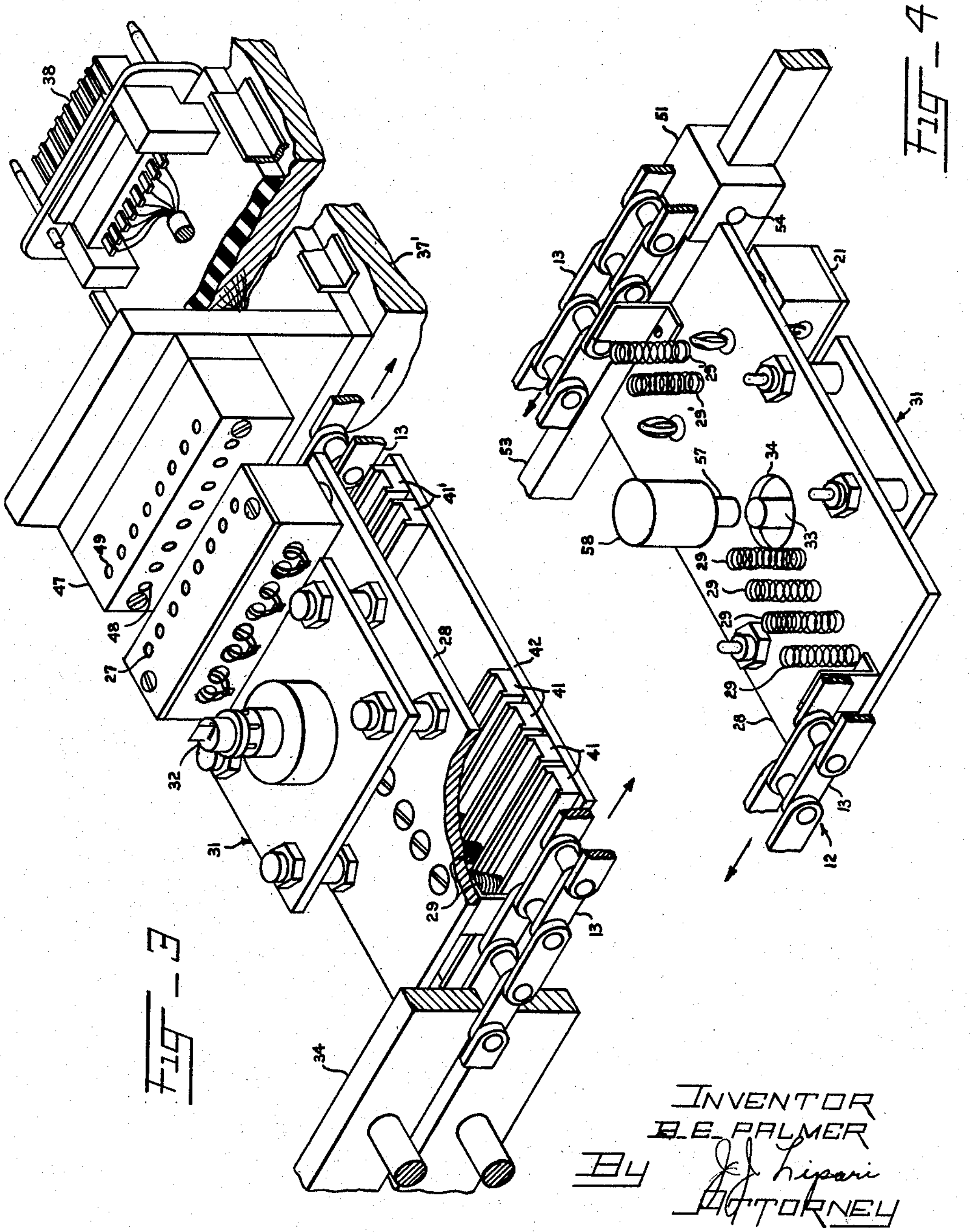
FIG. 3 shows a support for the article and memory block positioned in a test station of the test apparatus.
FIG. 4 shows a support for the article and memory block positioned in a sorting station of the test apparatus.

As shown in FIGS. 2, 3 and 4, the block 21 is mounted on a support 28 formed of a dielectric material. The support 28 is connected to the inner links of the chains 13—13 which, in turn, are supported within the members 34—34 for rolling movement therethrough. Mounted on the under side of the support 28 is a plurality of conductive elements, such as springs 29—29 and 29′—29′ whose function is to connect an article under test into a test circuit and to provide power for the memory block. Also mounted on the support 28 is a component article holder, generally designated by the numeral 31, adapted to receive an article to be tested 32. In the preferred embodiment shown, the article under test 32 is a transistor. However, it is to be understood that this is merely illustrative and that the invention may be used in the testing of other types of articles. The holder 31 has an ejector 33 supported for vertical movement through an aperture 34 extending through the support 28.

Figure 5:
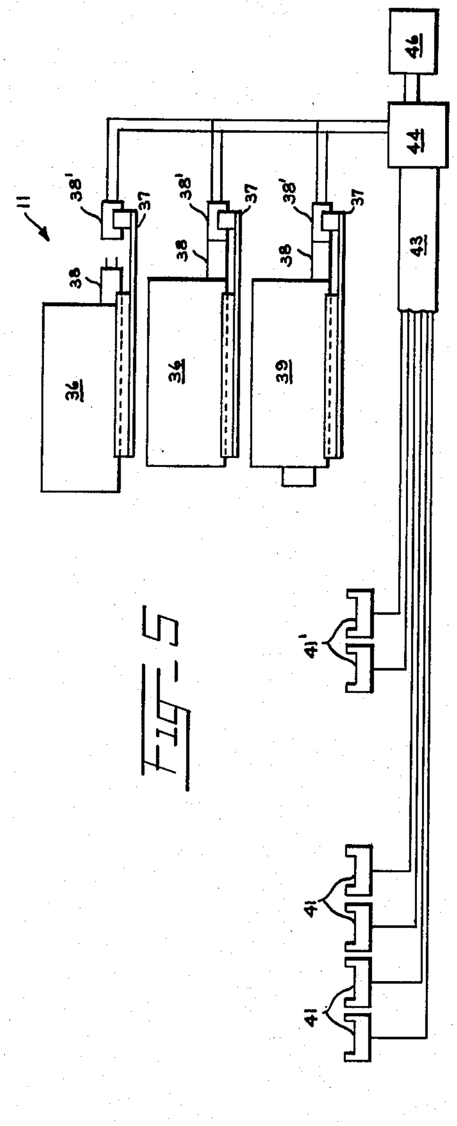
FIG. 5 is an end view of a typical test station of the test apparatus.

As shown in FIG. 5 a typical test station 11 may include a plurality of test sets 36, each being slidably supported on a shelf 37 and each having a connector 38 adapted to mate with a connector 38′ located on the shelf. An actuator or "read in" unit 39, which will be described in more detail below, is located on a similar bottom shelf 37′ and also has a connector 38 adapted to mate with a connector 38′. Connections from the test station 11 to the article 32 are made by means of a plurality of conductive members 41 of channel form located at each test station. The conductive members 41 are mounted on a dielectric support 42 and are engaged by the conductive elements 29—29 when the support 28 is located at one of the test stations. In a like manner, connections to the memory block 21 are made by a pair of continuous conductive members 41′—41′ of channel form which are mounted on the support 42, and are engaged by the conductive element 29′—29′. The conductive members 41—41 are connected through the leads of a cable 43 to a panel 44. The panel 44 has suitable provisions therein whereby the leads of the cable 43 are coupled to the test sets 36—36, the actuator unit 39 and to various sources of electrical power 46. Conductive elements 41′—41′ are likewise connected to the sources of electrical power 46.

As shown in FIGS. 2 and 3, the actuator or "read in" unit 39 includes a plurality of light sources 23—23, such as neon lamps, mounted in ablock 47, each light source corresponding to a particular article group or code, and being connected into a test station 11 by means of the connector 38. As is readily seen, the actuator block 47 is similar to the memory block 21 and includes a plurality of apertures 48—48, one for each lamp 23, to enable light to be radiated therefrom to the memory block and a plurality of apertures 49—49, one for each lamp 23, to enable monitoring of a testing operation. At the conclusion of the testing at a particular test station 11, only those lamps 23 of the "read in" unit 39 which correspond to those codes whose requirements the article 32 did not meet are lit. This results in the corresponding memory devices 26 of the block 21 being activated to their "On" state.

A sorting area for one of the codes is depicted in FIG. 4. This area includes a part of the return portion of the conveyor 12, the support 28 with the holder 31 and memory block 21 thereon having been inverted as it moved about the sprockets 14. A "read out" unit 51 which includes a photoelectric cell 52 (FIG. 6), disposed within a block 51, is mounted on a rail 53 such that when the support 28 is moved into the sorting area the aperture 54 of the "read out" unit is in registration with the corresponding code aperture of the memory block 21. The "read out" unit determines the state, i.e., "On" or "Off," of the memory device 26 corresponding to the code under consideration by sensing for the presence or non-presence of light and controls an eject mechanism associated therewith generally designated by the numeral 56 (FIG. 1).

As illustrated in FIGS. 1 and 4, the eject mechanism 56 includes a fluid operable plunger 57, which is mounted in a cylinder 58 secured to a support 59 and which is disposed in alignment with the ejector 33 of the holder 31 when the support 28 is positioned in a sorting area. The cylinder 58 is connected to a solenoid operable valve 61, which functions to connect and disconnect the cylinder with a fluid supply 62. In the present instance, the fluid is air under pressure and the plunger 57 has suitable means such as an internal spring disposed therein to hold it normally upward in the position shown. When the valve 61 is operated, the plunger 57 moves downwardly to engage the ejector 33 and cause downward movement thereof, thereby forcing the article 32 (FIG. 3) free of its holder 31. The article 32 then falls into a receptacle 63 associated with the sorting area.

In another area of the apparatus, as seen in FIG. 1, a reject receptacle 64 is provided. The reject receptacle 64 is disposed beneath a plunger 65 of a cylinder 66 whose solenoid operable valve 67 is operated after each interval of rest to assure ejection of any article into the reject receptacle 64 which does not fall into any of the groups or codes under consideration.

Figure 6:
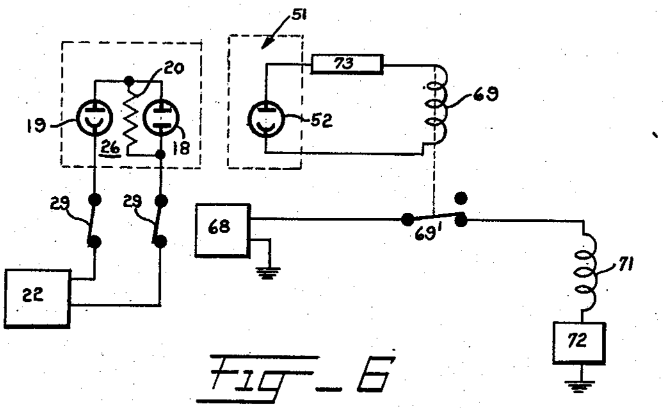
FIG. 6 is an electrical schematic of a circuit used for each sorting station.

FIG. 6 illustrates a schematic diagram of a circuit used for each sorting area. This circuit includes a source of electrical energy 68 connected in series with a normally closed contact 69′ of a relay 69, the solenoid winding 71 of the valve 61, and a conventional time delay unit 72. The relay 69 is connected in a circuit which includes a source of electrical energy 73 and a photoelectric cell 52 of a "read out" unit 51, the voltage across the relay with the cell in its dark state being insufficient to cause energization thereof.

When the support 28 is positioned in a sorting area, the "read out" unit 51 senses the state of the corresponding memory device 26. If the device 26 is in its "On" state, which indicates that the article does not belong to the code under consideration, the light radiating therefrom impinges on the photo cell 52, lowering the resistance thereof and causing the relay 69 to energize. Energization of relay 69 opens the contact 69′ and thereby prevents energization of the solenoid 71 and hence, ejectment of the article 32. The article 32 then passes on to successive sorting areas, where like circuits perform like sensing operations. If the device 26 is in its "Off" state, which indicates that the article 32 belongs to the code under consideration, the relay 69 fails to energize, and after a time interval, as determined by the time delay unit 72, a path for energizing current is provided to the solenoid winding 71. Energization of the solenoid 71 operates its valve 61 to activate the plunger 57 and thereby eject the article 32 in the code receptacle 63.

Figure 7:
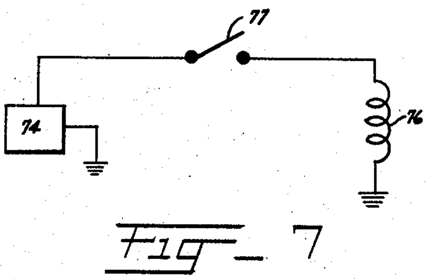
FIG. 7 is an electrical schematic of the reject circuit.

The reject circuit as illustrated in FIG. 7 includes a source of electrical energy 74 connected in series with the solenoid winding 76 of valve 67 and a suitable operable switch 77, which is closed after each movement of the conveyor to cause operation of the plunger 65.

The overall operation of the test apparatus will now be described.

The conveyor 12 of the apparatus is of sufficient length to provide a loading area where the articles 32 may be loaded into the holders 31 either manually or automatically. When each support 28 with its holder 31 is moved into a test station, the conductive elements 29 engage the conductive members 41 thereby connecting the article into the test circuit or circuits at that station. At the conclusion of the testing, the results thereof are optically stored in the memory block 21 associated with each article 32.

The article then proceeds to the sorting stations. At each sorting station an optical sensing operation to determine the code to which the article 32 belongs is performed. If the article 32 belongs to the code of a particular sorting station, the article will be ejected and dropped into a receptacle 63 associated therewith. If after the article 32 has passed through all of the sorting stations it has not been ejected, the article 32 is considered a reject and is ejected into the reject receptacle 64.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a test apparatus having a plurality of test stations for testing articles to determine to which one of a plurality of groups the articles belong; a plurality of sorting stations, each of which corresponds to one of said groups and includes an eject mechanism; and an endless conveyor intermittently movable to feed the articles, which are disposed on individual supports, first into the test stations where the articles are tested, and then into the sorting stations where the articles are sorted in accordance with the results of the testing at the test stations, a test memory and retrieval system therefor, which comprises:

(*a*) a memory block mounted on each support and including a plurality of "On-Off" photoelectric memory devices corresponding respectively to the groups to which an article can belong, and arranged in a spaced linear array such that the devices lie in the path of travel of the conveyor, each memory device including a neon lamp and a photoelectric cell, and being in its "Off" state when the neon lamp thereof is unlit, and being in its "On" state when the neon lamp thereof is lit, the neon lamp and photoelectric cell of each device being electrically connected in series and physically situated within a memory block such that, if the device is in its "Off" state, light impinging on the photocell lowers the resistance thereof to thereby cause the neon lamp to light, the light from the neon lamp impinging upon the photocell to maintain its resistance at its lowered value and thereby maintain the lamp in its lit state;

(*b*) a "read-in" unit at each test station, each "read-in" unit including a plurality of light sources corresponding respectively to the groups to which an article can belong, said light sources being arranged similarly to the memory devices of a memory block so that when an article support is positioned at rest in a test station, each of the light sources associated therewith is aligned with a corresponding one of the memory devices of the memory block of said article support;

(*c*) means at each test station for supplying the results of the testing of an article thereat to the associated "read-in" unit to energize those light sources of the unit representing groups, the requirements of which an article has failed to meet, the energized light sources radiating light only to their corresponding memory devices to trigger these devices to their "On" state if said devices are not already in their "On" state by virtue of the testing at a previous test station; and (*d*) a photoelectric "read-out" unit at each sorting station, each "read-out" unit being situated in its respective sorting station such that when an article support is located at rest thereat the "read-out" unit is aligned with the memory device corresponding to that sorting station to sense the state of said memory device and to actuate the sorting station eject mechanism to eject the article, if the sensed memory device is in its "Off" state.

2. Apparatus in accordance with claim 1 wherein:

each memory block includes electrode means extending therefrom and electrically connected to the memory devices of the block such that said devices are connected in parallel; and a conductive track upon which the electrode means ride, the track being connected to a source of electrical power so as to supply said power to the devices through the eletcrode means and being continuous along the path of travel of the conveyor from a point before the first test station to a point after the last sorting station so as to continuously supply electrical power to the memory devices during their travel between these two points, whereby a memory device once triggered to its "On" state stays in this state until said device has exited from the last sorting station.

3. Apparatus in accordance with claim 2 wherein:

each "read-out" unit includes a photoelectric cell; and respective first and second associated circuits are provided for controlling the operation of the eject mechanism, each first circuit includes the photoelectric cell of the associated "read-out" unit, a source of electrical power and a relay arranged in series such that the relay energizes only when light impinges on the photocell from an aligned "On" memory device, indicating that the associated article has not met the requirements of the associated sorted station, and each associated second circuit includes a normally closed contact of the first relay, a time delay unit, a solenoid coil for operating the associated eject mechanism and a source of electrical power arranged in series such that the solenoid coil energizes to operate the eject mechanism, after a time delay as determined by the time delay unit, if the first relay does not energize to open its contact, the solenoid coil remaining de-energized if, during the rest period, the first relay energizes to open its contact.

References Cited by the Examiner

UNITED STATES PATENTS

| | | | |
|---|---|---|---|
| 2,742,631 | 4/56 | Rajchman. | |
| 3,039,604 | 6/62 | Bickel | 209—75 |
| 3,040,178 | 6/62 | Lyman. | |
| 3,052,405 | 9/62 | Woodland | 250—208 X |

FOREIGN PATENTS

| | | | |
|---|---|---|---|
| 879,660 | 10/61 | Great Britain. | |

SAMUEL F. COLEMAN, *Primary Examiner.*

ROBERT B. REEVES, ERNEST A. FALLER, Jr., *Examiners.*